United States Patent [19]
Lu

[11] Patent Number: 5,662,255
[45] Date of Patent: Sep. 2, 1997

[54] LOCK HOLDER FOR FASTENING TO A MOTORCYCLE FOR CARRYING A MOTORCYCLE LOCK

[76] Inventor: Chien-Chzh Lu, No. 24, Chi-An St., Kang-Shan Chen, Kaohsiung Hsien, Taiwan

[21] Appl. No.: 566,426

[22] Filed: Nov. 30, 1995

[51] Int. Cl.⁶ .................................. B62J 7/00; B62J 9/00
[52] U.S. Cl. .......................... 224/451; 224/428; 224/448; 224/935; 248/309.1
[58] Field of Search ........................ 224/413, 425, 224/433, 441, 447, 448, 451, 459, 935, 39, 30 R, 428; 248/230.1, 309.1

[56] References Cited

U.S. PATENT DOCUMENTS

| | | | |
|---|---|---|---|
| 4,736,921 | 4/1988 | Zane et al. | 224/935 |
| 4,961,505 | 10/1990 | Moeller | 211/70.8 |
| 5,076,526 | 12/1991 | Zane et al. | 224/425 |
| 5,386,961 | 2/1995 | Lu | 224/935 |
| 5,405,113 | 4/1995 | Jaw | 224/935 |
| 5,458,308 | 10/1995 | Lin | 224/935 |

Primary Examiner—Henry J. Recla
Assistant Examiner—Gregory M. Vidovich
Attorney, Agent, or Firm—Varndell Legal Group

[57] ABSTRACT

A lock holder including a split tube-like mounting unit for fixing to the frame of a motorcycle, and a lock carrier unit at one side of the mounting unit for holding a motorcycle lock of the type comprising a U-shaped casing with a cylinder block at one end and a lock cylinder in the cylinder block, and a U-shaped locking bar with a slotted plug rod at one end, wherein the lock carrier unit comprises a flat bottom wall, a round hole at the center of the flat bottom wall for passing the slotted plug rod of the U-shaped locking bar for permitting it to be connected to the U-shaped casing and locked by the lock cylinder, an upright wall raised from the border of the flat bottom wall, a recess on the upright wall at an inner side for receiving the cylinder block, and a through hole through the recess, the keyway of the lock cylinder being aligned with the through hole of the upright wall when the cylinder block is attached to the recess.

1 Claim, 6 Drawing Sheets

LOCK HOLDER FOR FASTENING TO A MOTORCYCLE FOR CARRYING A MOTORCYCLE LOCK

BACKGROUND OF THE INVENTION

The present invention relates to lock holders for fastening to the frame of a motorcycle for carrying a motorcycle lock, and relates more particularly to such a lock holder which permits the motorcycle lock to be fixedly secured in place when loaded.

FIG. 1 shows a regular lock holder for fastening to the frame of a motorcycle for carrying a motorcycle look. This structure of lock holder comprises a mounting unit for fixing to the frame of a motorcycle, and a carrier unit at one side of the mounting unit for carrying a motorcycle lock. However, this structure of lock holder is still not satisfactory in function. When the motorcycle runs over an uneven road, the lock holder may be heavily vibrated, causing the motorcycle lock to fall out of the lock holder. Furthermore, the motorcycle lock tends to be stolen when it is carried on the lock carrier.

SUMMARY OF THE INVENTION

The present invention has been accomplished to provide a lock holder which eliminates the aforesaid drawbacks. When the motorcycle lock is carried on the lock holder, it can be locked to the lock carrier unit of the lock holder, and therefore the motorcycle lock will not fall out of the lock holder when the motorcycle runs over an uneven road.

DETAILED DESCRIPTION OF THE PREFERRED EMBODIMENT

Figure 1:
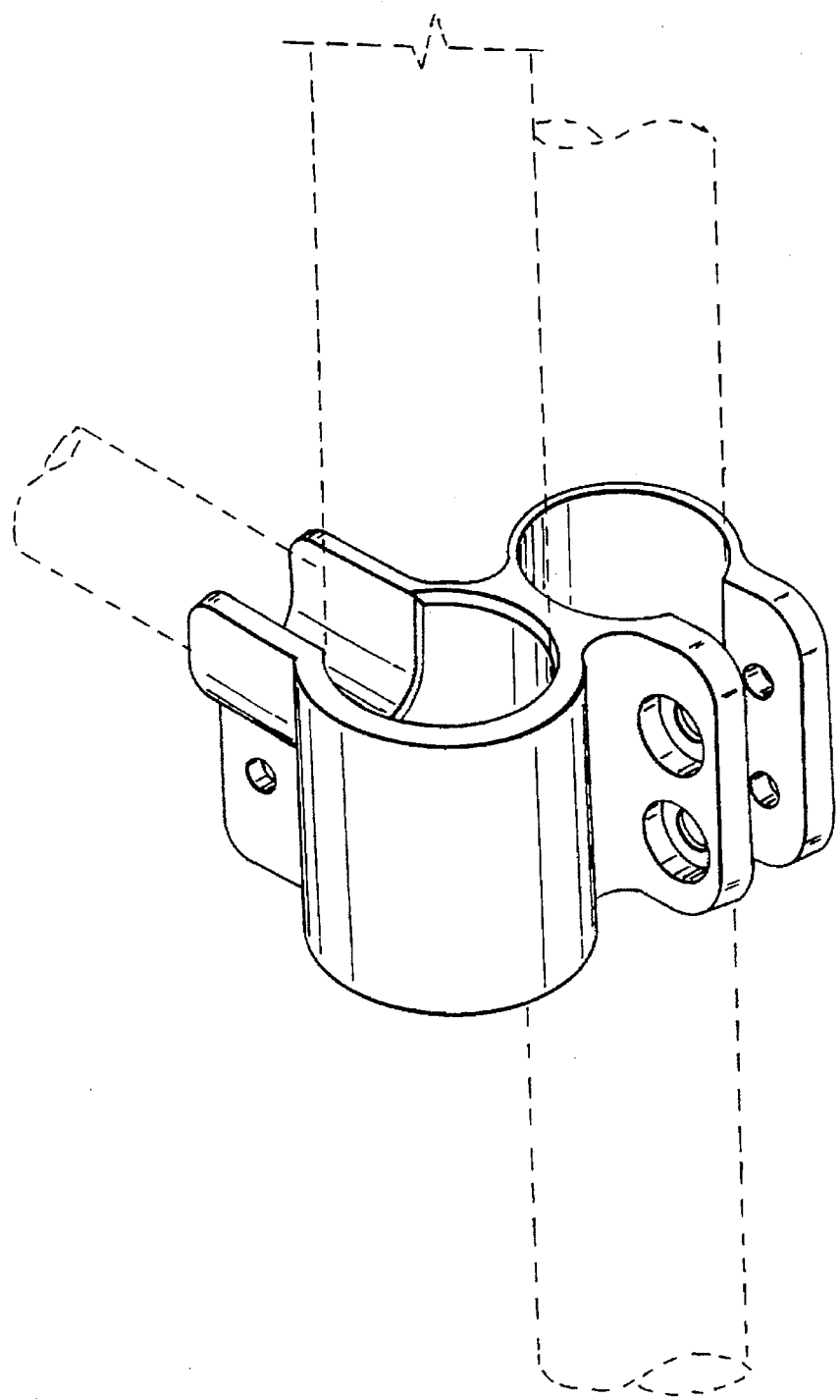
FIG. 1 shows a lock holder according to the prior art.
Figure 2:
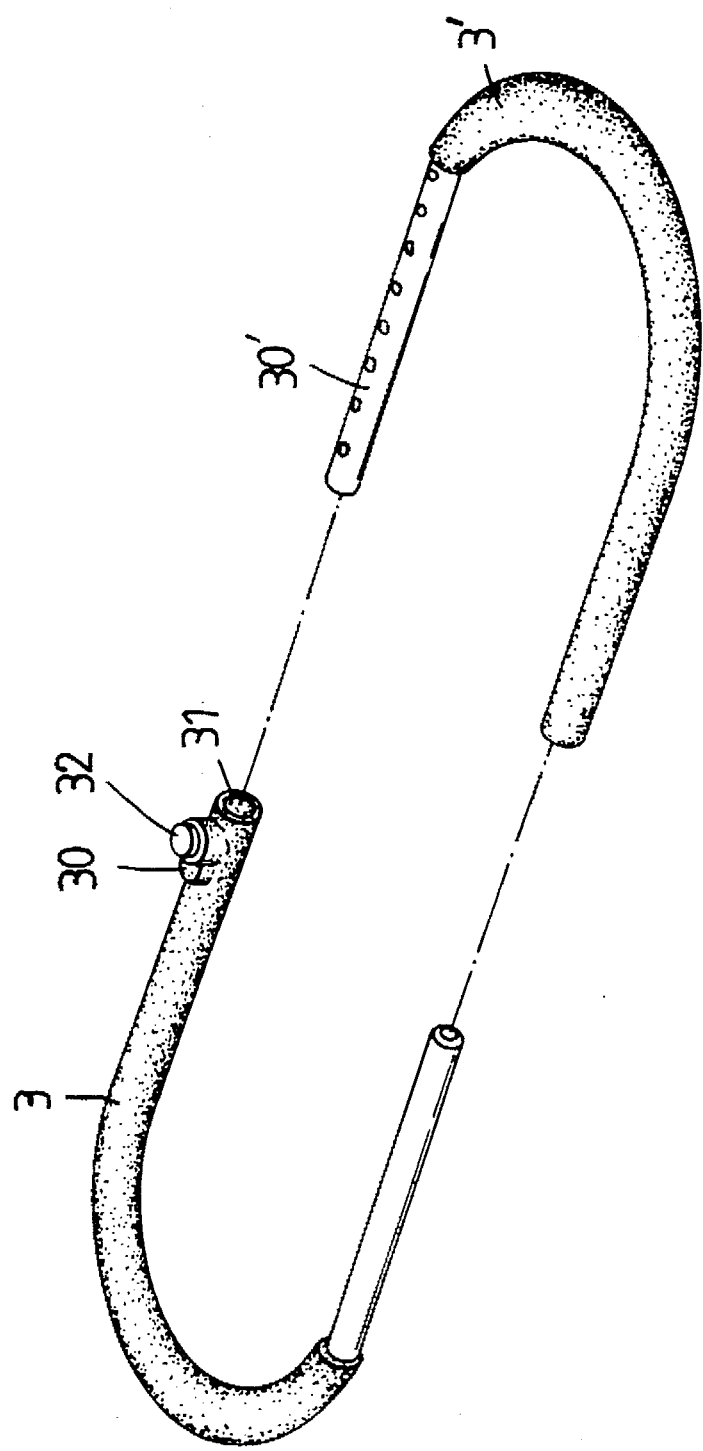
FIG. 2 is an exploded view of a regular motorcycle lock.
Figure 3:
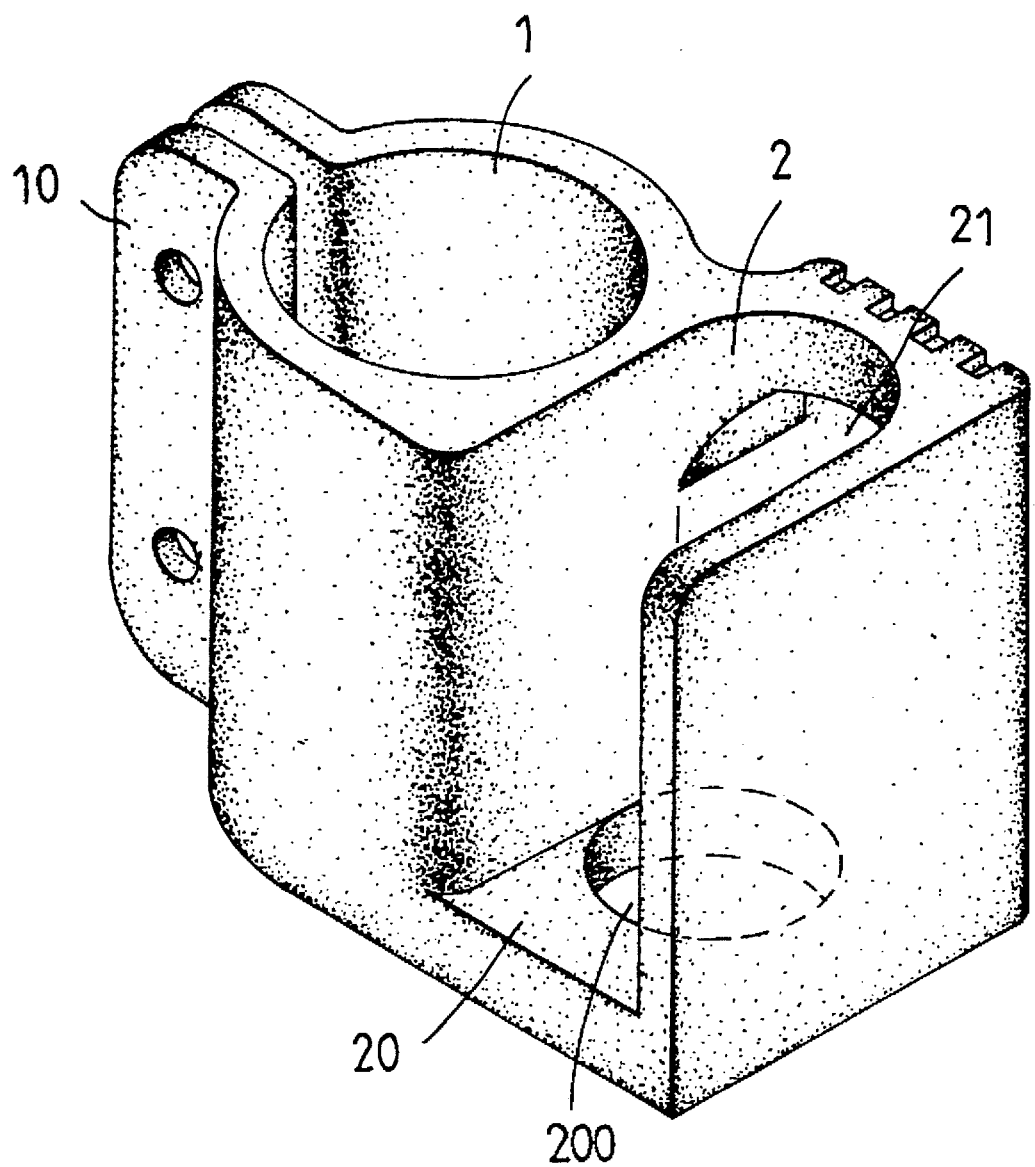
FIG. 3 is an elevational view of a lock holder according to the present invention.
Figure 4:
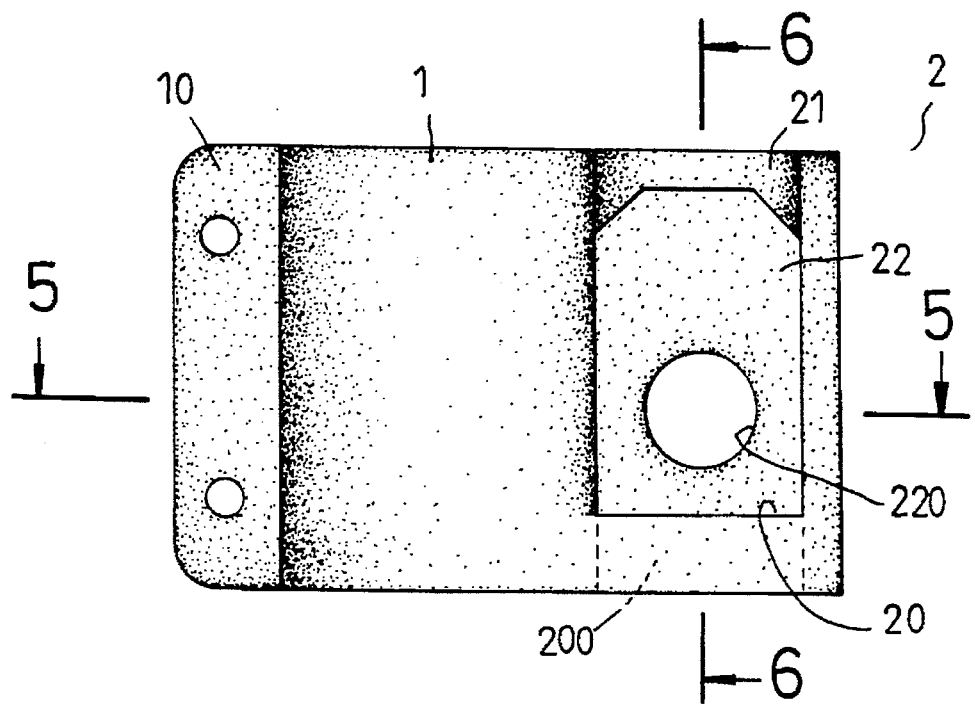
FIG. 4 is a front view of the lock holder shown in FIG. 3.
Figure 5:
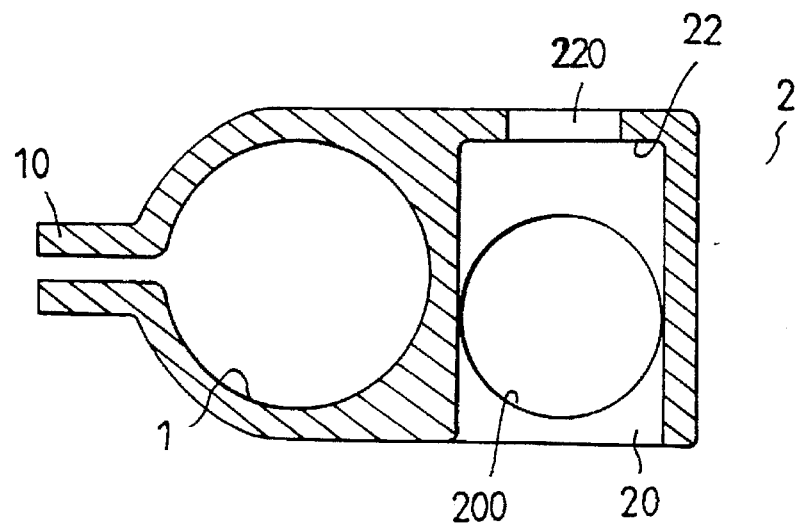
FIG. 5 is a sectional view along line 5—5 of FIG. 4.
Figure 6:
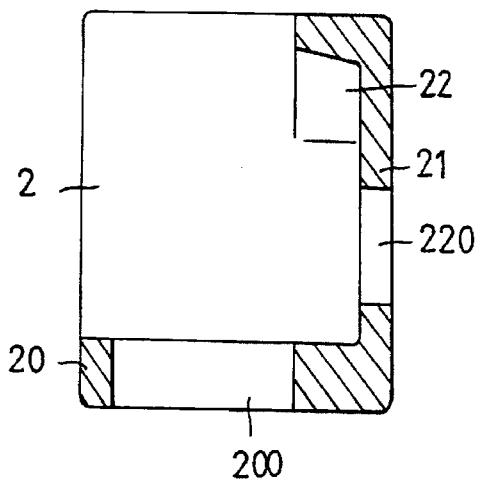
FIG. 6 is a sectional view along line 6—6 of FIG. 4.

The present invention is designed for fastening to the frame of a motorcycle to hold a motorcycle lock of the type comprising a U-shaped casing 3 with a cylinder block 30 at one end and a lock cylinder 32 in the cylinder block 30, and a U-shaped locking bar 3' with a slotted plug rod 30' at one end (see FIG. 2).

Referring to FIGS. from 3 to 6, a lock holder in accordance with the present invention comprises a split tube-like mounting unit 1 having two opposite clamping plates 10 for fastening to the frame of a motorcycle by screws, and a lock carrier unit 2 for holding a motorcycle lock. The lock carrier unit 2 comprises a flat bottom wall 20, a round hole 200 at the center of the flat bottom wall 20, an upright wall 21 raised from the border of the flat bottom wall 20, a recess 22 on the upright wall 21 at an inner side, and a through hole 220 through the recess 22.

Figure 7:
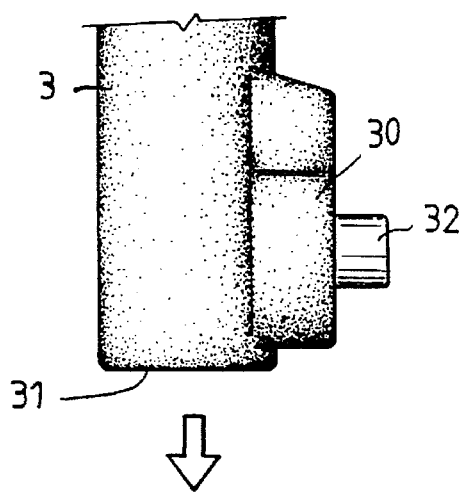
FIG. 7 is a schematic drawing showing the relation between the motorcycle lock and the lock holder according to the present invention.
Figure 7:
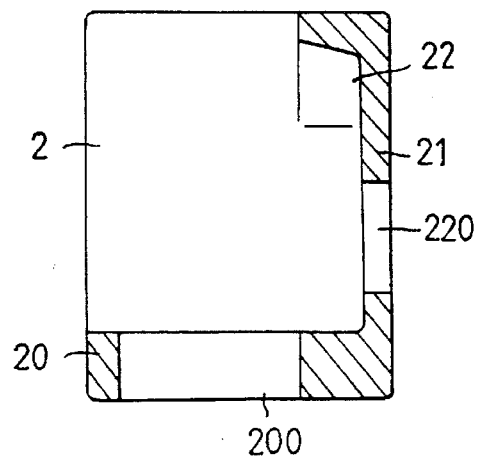
Figure 8:
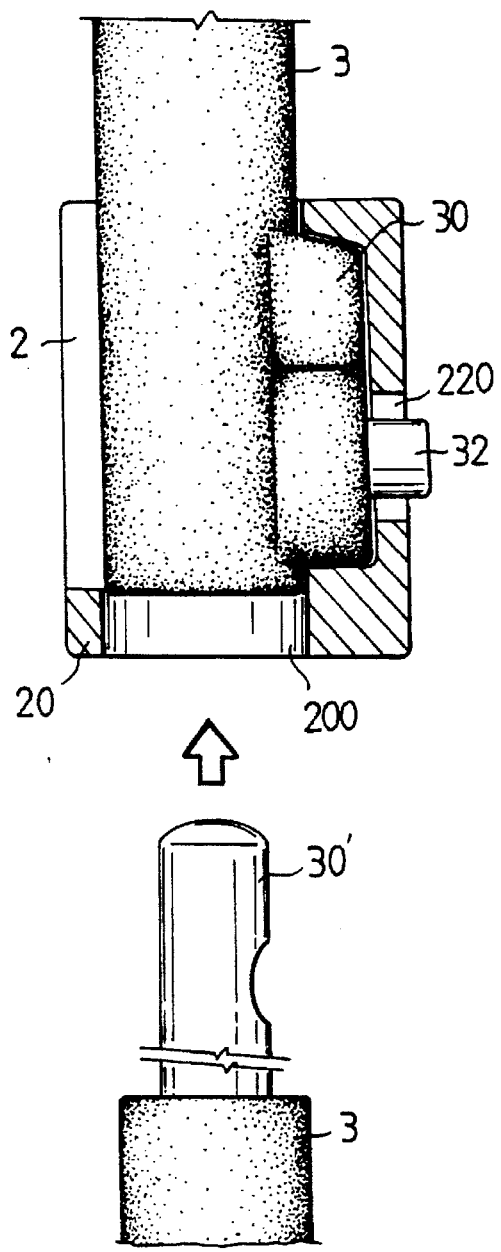
FIG. 8 shows the motorcycle lock mounted on the lock holder according to the present invention.
Figure 9:
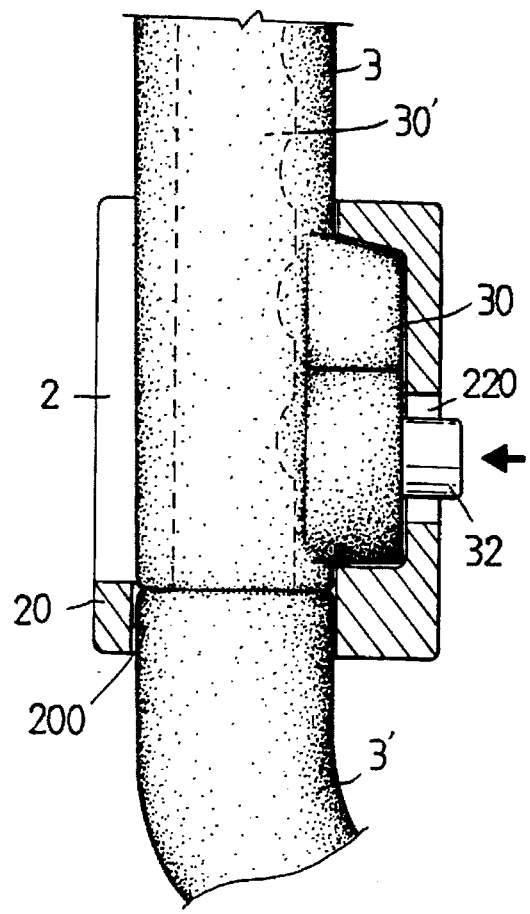
FIG. 9 shows the motorcycle lock mounted on the lock holder and locked.

Referring to FIGS. 7, 8, and 9, the cylinder block 30 of the U-shaped casing 3 of the motorcycle look is inserted into the carrier unit 2 and attached to the recess 22 of the upright wall 21, permitting the receiving end 31 of the U-shaped casing 3 of the motorcycle lock to be aligned with the round hole 200, and then the slotted plug rod 30' of the U-shaped looking bar 3' of the motorcycle lock is inserted through the round hole 200 from the bottom side into the receiving end 31 of the U-shaped casing 3, and then the lock cylinder 32 is depressed to lock the receiving end 31 of the U-shaped casing 3 and the slotted plug rod 30' of the U-shaped looking bar 3' together. When to disconnect the motorcycle look from the lock holder, the key is inserted through the through hole 220 into a keyway of the lock cylinder 32 to unlock the motorcycle lock.

I claim:

1. A lock holder comprising a split tube-like mounting unit for fixing to the frame of a motorcycle, and a lock carrier unit at one side of said mounting unit for holding a motorcycle lock of the type comprising a U-shaped casing with a cylinder block projecting therefrom at one end and a lock cylinder having a keyway mounted in said cylinder block, and a U-shaped locking bar with a slotted plug rod at one end adapted to be inserted into said one end of said cylinder block for engagement with said lock cylinder, wherein said lock carrier unit comprises a flat bottom wall, and a flat top wall wherein each said wall has opposing peripheral edge portions, a first recess in said top wall extending through one edge portion thereof for receiving said U-shape casing, a round hole at the center of said flat bottom wall for passing the slotted plug rod of said U-shaped locking bar for permitting it to be connected to one end of said said U-shaped casing and locked by said lock cylinder, an upright wall extending between an opposite edge portion of said top wall and said flat bottom wall, a second recess defined in said upright wall at an inner side for receiving said cylinder block, and a through hole through said upright wall for alignment with said keyway of said lock cylinder when said cylinder block is inserted into said lock carrier mount.

* * * * *